(12) United States Patent
Petty

(10) Patent No.: US 6,796,339 B1
(45) Date of Patent: Sep. 28, 2004

(54) APPARATUS FOR FLUSHING, REPLACING FLUID AND BLEEDING HYDRAULIC SYSTEMS

(75) Inventor: Jon A. Petty, Tucson, AZ (US)

(73) Assignee: Phoenix Systems, L.L.C., Tucson, AZ (US)

( * ) Notice: Subject to any disclaimer, the term of this patent is extended or adjusted under 35 U.S.C. 154(b) by 0 days.

(21) Appl. No.: 10/613,258

(22) Filed: Jul. 3, 2003

(51) Int. Cl.⁷ .................................................. B65B 3/04
(52) U.S. Cl. .............................. 141/65; 141/59; 141/69; 184/1.5
(58) Field of Search ............................. 141/98, 67, 59, 141/65, 286, 301, 302, 69, 72–74; 184/1.5

(56) References Cited

U.S. PATENT DOCUMENTS

| | | | |
|---|---|---|---|
| 5,060,703 A | * 10/1991 | Koerner | 141/59 |
| 6,206,055 B1 | 3/2001 | Hollub et al. | 141/98 |
| 6,302,167 B1 | 10/2001 | Hollub et al. | 141/98 |
| 6,481,469 B1 | * 11/2002 | Erwin et al. | 141/95 |

* cited by examiner

Primary Examiner—Steven O. Douglas
(74) Attorney, Agent, or Firm—Antonio R. Durando; Quarles & Brady Streich Lang LLP

(57) ABSTRACT

A hydraulic system servicing apparatus includes an old fluid holding vessel and a new fluid supply vessel with a selector valve which draws fluid from the holding vessel during flushing operations and draws fluid from the supply vessel during fluid replacement and bleeding operations. A pump moves the fluid through the selector valve and supplies it to a flow reversing valve which has a master cylinder line and a plurality of bleeder valve lines for connection to the hydraulic system. A shutoff valve is provided in each bleeder valve lines for directing fluid through the different branches of the hydraulic system. To flush the system, the flow reversing valve is cycled to circulate the fluid from the old fluid holding vessel in opposite directions and return it to the old fluid holding vessel. To replace the fluid and bleed the system, the fluid selector valve directs new fluid through the flow reversing valve into the system.

36 Claims, 4 Drawing Sheets

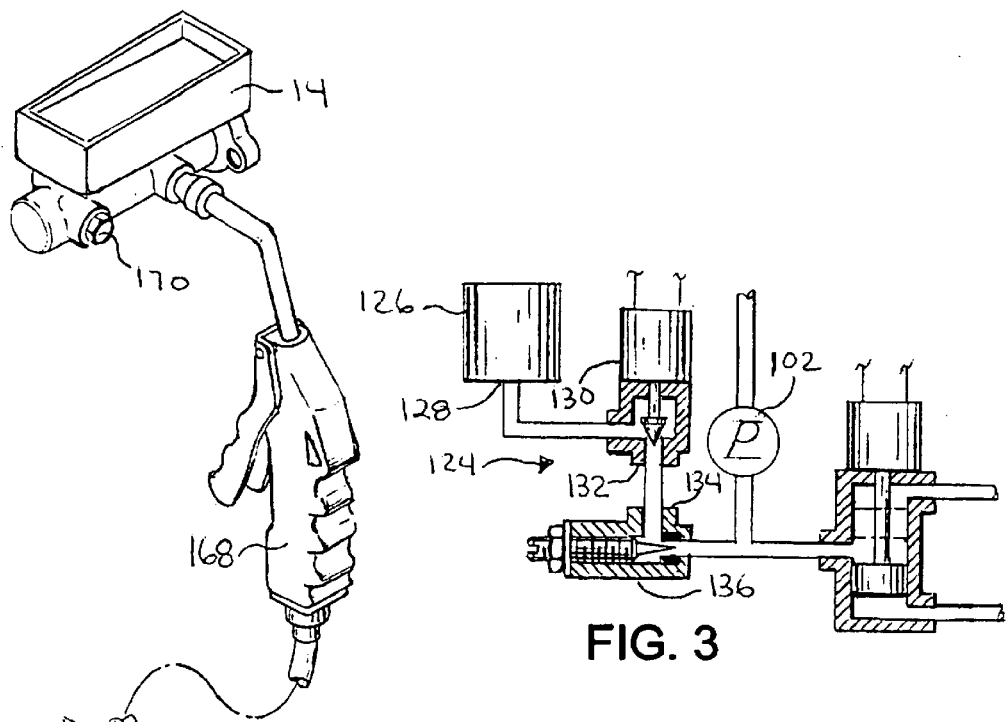
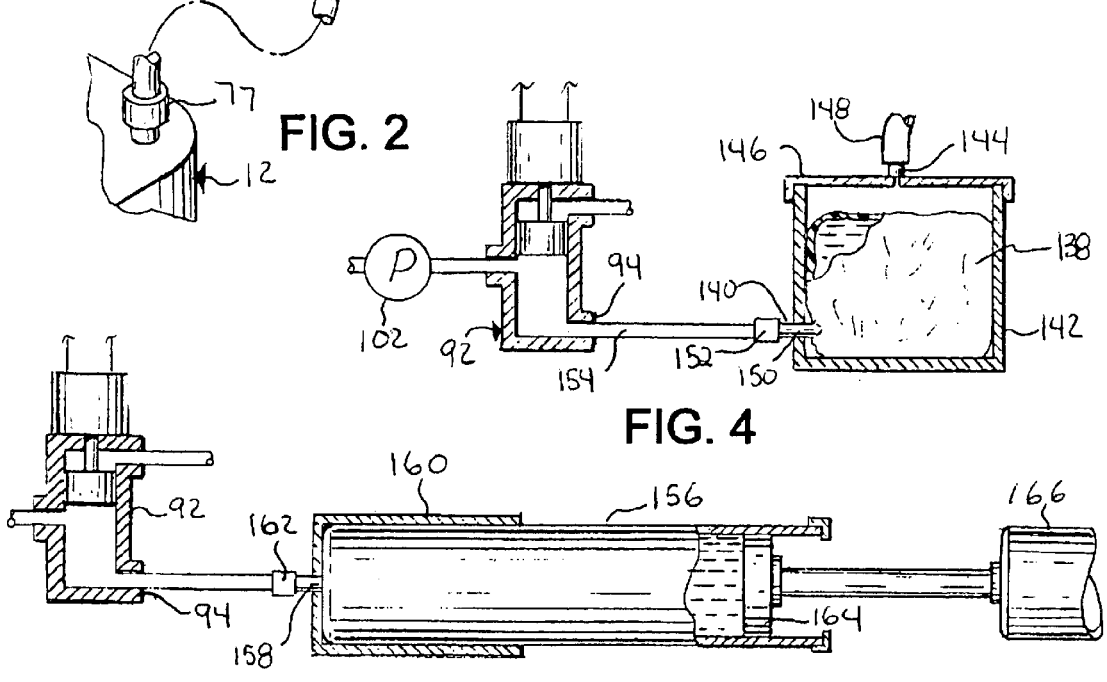
FIG. 2
FIG. 3
FIG. 4
FIG. 5

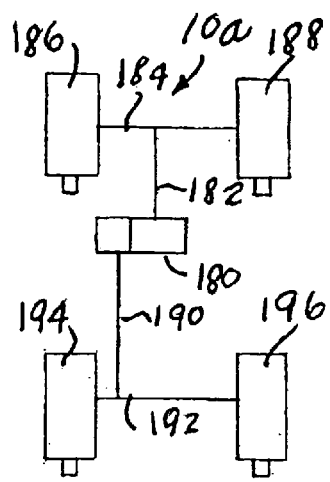 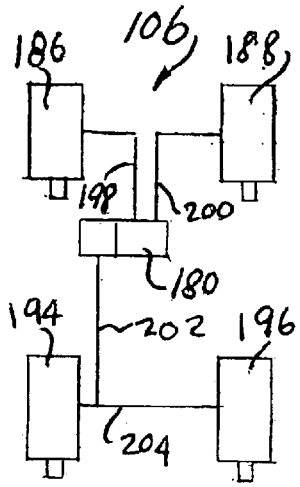 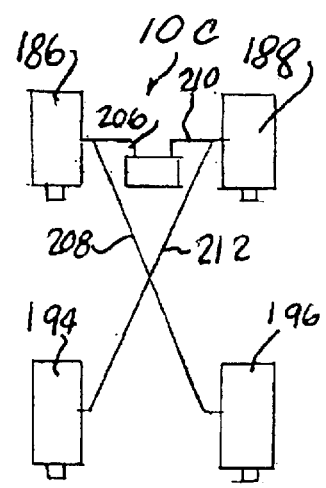
FIG. 7   FIG. 8   FIG. 9
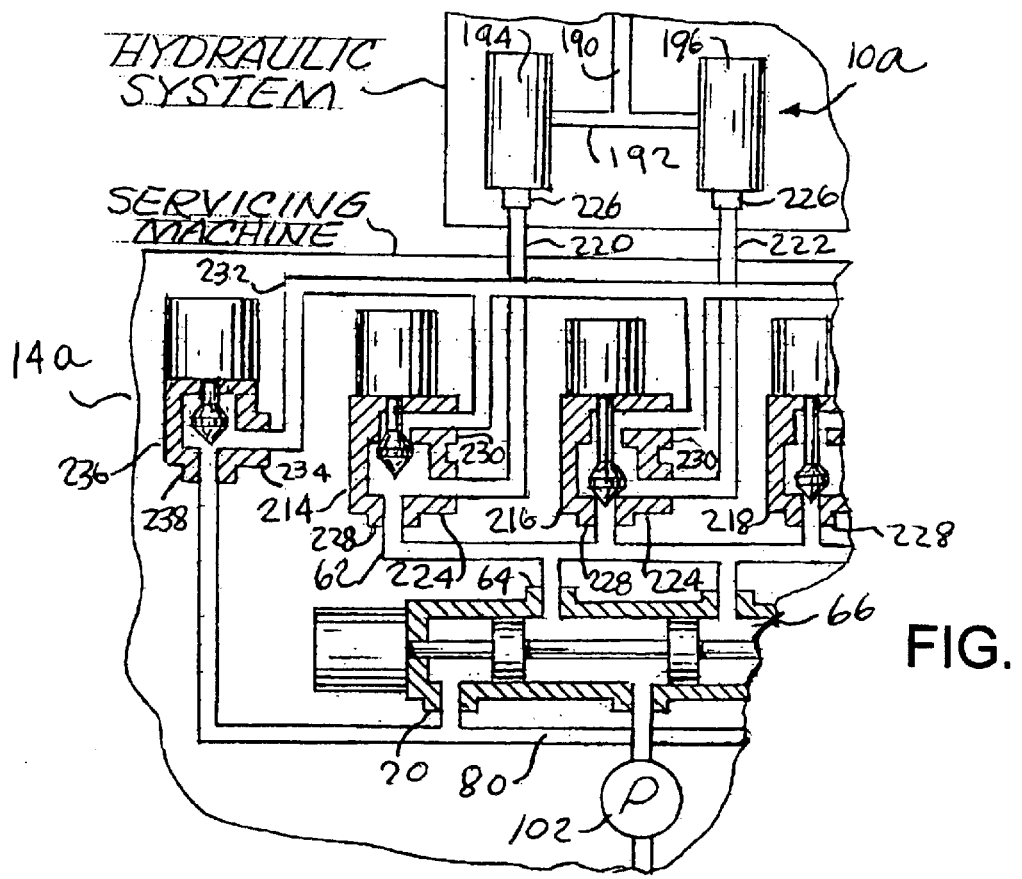
FIG. 10

APPARATUS FOR FLUSHING, REPLACING FLUID AND BLEEDING HYDRAULIC SYSTEMS

BACKGROUND OF THE INVENTION

1. Field of the Invention

This invention relates in general to the servicing of hydraulic systems and more particularly to an apparatus for flushing contaminants from hydraulic systems by recirculating the used fluid and subsequently replacing it with new fluid and bleeding air from the system.

2. Description of the Prior Art

Hydraulic fluid is used to transmit the pressure exerted on a motor vehicle's brake pedal to the slave cylinders provided at the wheels of the vehicle. The most commonly used hydraulic brake fluids consist of glycol-based liquids identified as DOT3 and DOT4 on the basis of the boiling points resulting from their particular composition.

Copending U.S. Ser. No. 10/030,455, hereby incorporated by reference, discloses a novel approach for estimating the condition of brake fluid based on the discovery that moisture content is closely correlated to the copper content in the fluid. The invention consists of a reactive test strip adapted to measure and indicate the concentration of copper ions in brake fluid in terms of a readily visible color change. The strip is immersed in the fluid and the resulting color acquired by reacting with the fluid is compared to a copper concentration-versus-color chart or to a standard color representative of the maximum concentration determined empirically to correspond to a fluid condition considered appropriate for normal operation.

Another important aspect of brake system maintenance is the corrosive nature of some of their constituents, which, upon contamination of the brake fluid, progressively contribute to damage of the metallic tubing and other parts of the brake system. In conventional brake fluids, amines are added to inhibit corrosion and prevent damage to metal parts that operate in contact with the fluid. As the brake fluid ages, its anticorrosive properties are measured in terms of reserve alkalinity; that is, the amount of amines remaining in the fluid to buffer the acidity resulting from a breakdown of the fluid constituents. Over time, thermal oxidation and volatization produce a significant reduction of the amine content and the concurrent decrease in anticorrosive properties. Tests have shown that the reserve alkalinity of DOT3 and DOT4 fluids is reduced to about 20 percent of its original value after 18 to 20 months of normal operation. Therefore, brake fluids need to be checked and periodically replaced in order to prevent the development of potentially unsafe conditions in the brake system. Accordingly, industry maintenance recommendations are typically based on service time and milage of the vehicle.

Following the work described in U.S. Ser. No. 10/030, 455, it has been found that copper content is predictably related also to time and milage of vehicle operation. Thus, this correlation has similarly been used to determine the need to replace the fluid based on "virtual age"; that is, the wear and tear on the brake fluid, rather than the actual service time and/or milage. If a color change in the test strip indicates a higher-than-desirable copper concentration, the brake fluid is considered in need of replacement without further tests. This invention is described in copending U.S. Ser. No. 10/132,978.

The prior art methods for replacing deteriorated and contaminated brake fluid with new fluid are varied, however, the most common method used is a two-person operation which takes about 45 minutes to an hour to complete. Usually, the master cylinder is drained of the old fluid, cleaned and then refilled with new clear fluid. Then one person attaches a drain line to the bleeder valve of one of the wheel cylinders and opens the bleeder valve and the other person pumps the brake pedal to move the new fluid through the system to expel the old fluid out through the bleeder valve and through the drain line into a suitable container. When the clear new brake fluid emerges from the open bleeder valve, draining of the old fluid from that branch of the system is terminated and the valve is closed. This operation is repeated for each wheel cylinder with new brake fluid being added to the master cylinder as needed during the draining operation. When the brake system is drained and refilled in this manner, it must subsequently be bled to remove the air introduced during the draining and refilling operation. This prior art method of replacing old brake fluid with new fluid has several drawbacks; it is time consuming, requires the services of two people, and uses an excessive amount of brake fluid in that the new fluid which emerges from the bleeder valves during the replacement and bleeding operations cannot be reused due to it having been exposed to system contamination.

Some of these drawbacks have been overcome by a closed system fluid replacement apparatus and method disclosed in U.S. Pat. Nos. 6,206,055 and 6,302,167 to Peter C. Hollub. The Hollub apparatus includes a vacuum wand which extracts the old fluid and contaminants from the master cylinder. A fill pump is used for supplying new fluid under pressure from a closed container to the master cylinder and at the same time a vacuum pump is connected to extract the old fluid from all of the bleeder valves simultaneously and directing it to a closed waste fluid tank. Also disclosed is the periodic shutting off and restarting of the fill and vacuum pumps to produce a fluid surging to flush contaminants from the system. The Hollub apparatus does away with the need for using two-man and reduces the time required to complete the replacement operation. However, the Hollub apparatus is not especially efficient in flushing the old brake fluid and contaminants from the brake system. When the old brake fluid is extracted from all the brake lines simultaneously, the fluid will take the path of least resistance and the longer lines will often have insufficient flow to clean out the sludge and corrosion by-products. Also, supplying the new brake fluid to the system while extracting the old brake fluid provides a single flow of fluid through the system, that is, as the old fluid moves out, the new fluid moves in. It has been found that a single flow of fluid through the system oftentimes leaves some sludge and corrosion by-products behind.

Therefore a need exists for a new and improved apparatus for flushing, replacing the fluid and bleeding hydraulic systems which overcomes the shortcomings of the prior art.

SUMMARY OF THE INVENTION

In accordance with the present invention, a new and improved servicing apparatus for flushing, replacing the fluid and bleeding hydraulic systems is disclosed. Hydraulic systems of the type serviceable by the apparatus of the present invention normally include a master cylinder which supplies fluid under pressure to a plurality of slave cylinders each of which has a bleed valve for bleeding air from the system. Most modern brake systems are provided with an Antilock Brake System (ABS) in the form of a computer controlled module which also has at least one bleeder valve. The servicing apparatus has a plurality of bleeder valve lines each of which is for connection to a different one of the bleeder valves and an independently operable shutoff valve is provided in each of these bleeder valve lines. The servicing machine also includes a master cylinder line which is connected to the top end of the master cylinder by means of a suitable adapter. A new fluid supply source and an old fluid holding vessel are provided in the servicing apparatus and both are coupled to a different one of a pair of inlet ports of a flow selector valve. The flow selector valve has an outlet port that is connected to the inlet of a pump and the flow selector valve is operable to direct fluid to the pump from either the new fluid supply source or the old fluid holding vessel. The pump is preferably of the type which produces a pulsating output and supplies fluid under pressure to a two-position flow reversing valve. To initiate a servicing operation, the flow selector valve is positioned to direct fluid from the new fluid supply source vessel through to the two-position flow reversing valve which in turn directs the fluid under pressure through the master cylinder line to the top of the master cylinder. This causes the fluid to flow through the hydraulic system and out through the bleeder valves of the slave cylinders and into the servicing apparatus to fill the old fluid holding vessel. After initiation, the flow selector valve is operated to a first position wherein fluid from the old fluid holding vessel is directed through the hydraulic system and out through the bleeder valves as described above. Selective operation of the shutoff valves provided in the bleeder valve lines will allow fluid to flow out of all of the bleeder valves simultaneously or one at a time in any desired sequence. The fluid from the bleeder valves is directed through the flow reversing valve into a manifold which returns it to the old fluid holding tank. When the flow reversing valve is actuated to its second position, the fluid supplied by the pump will be directed under pressure through the hydraulic system in a direction that is opposite to the flow direction provided in the flow reversing valve's first position. In this manner, switching the flow reversing valve back and forth between its first and second positions will move the old brake fluid in one direction through the hydraulic system and then in the reverse direction to flush the system.

The servicing apparatus may also include a vibration mechanism, a filter and a pressure port with a detachable nozzle. The vibration device is attachable to the master cylinder, and is movable to other components of the hydraulic system, to loosen contaminants in the system. The filter is used to remove particulate contaminants from the old fluid that is being returned to the old fluid holding vessel for re-circulation through the hydraulic system during the flushing operation. The nozzle is a hand operated device for connection to the pressure port for initial cleaning of the master cylinder and for bench bleeding the various components of the hydraulic system when the flow reversing valve is in the first position.

When flushing the hydraulic system has been completed, the flow selector valve is operated to shut off the flow from the old fluid holding vessel and supply fluid from the new fluid supply source to the inlet port of the pump. With the flow reversing valve in either its first or second position, and the shutoff valves in the bleeder valve lines are opened in any desired sequence, the new fluid will be supplied to the hydraulic system to replace the old fluid and simultaneously bleed the air from the system.

The servicing apparatus can be configured in various ways for detecting the completion of the fluid replacement and bleeding operations. In a first embodiment an optical sensor is provided for determining the clarity of the fluid being returned to the holding vessel from the hydraulic system and providing an indication when clean fluid is detected. To aid in such a determination, a fluid compatible dye may be injected into the replacement fluid at the beginning of the fluid replacement and bleeding operations. In a second embodiment, an ion-selective electrode is used to provide a suitable indication when the ions of a trace element, such as copper, are no longer detected in the fluid emerging from the hydraulic system. In still another embodiment, the new fluid supply is provided in pre-packaged containers that having an amount of fluid that is equal to or slightly greater than the fluid capacity of the hydraulic system being serviced.

In another embodiment, the apparatus is provided with three-way valves instead of shutoff valves to provide a cross-flushing capability of systems having interconnected components.

In the preferred embodiment, the pump and all of the valves of the servicing apparatus are electrically operated and are controlled by an electronic control unit. The electronic control unit is programable to change the operational sequence, timing and other functions of the servicing machine to suit the particular hydraulic system to be serviced.

BRIEF DESCRIPTION OF THE DRAWINGS

FIG. 2 is a fragmentary perspective view showing a hand held nozzle being connected to a pressure port of the servicing apparatus for bench bleeding a typical master cylinder.

FIG. 3 is a schematic diagram showing a fragmentary portion the servicing apparatus of the present invention which has been modified to include a trace element or dye injection system.

FIG. 4 is a fragmentary schematic diagram showing a second embodiment the servicing machine of the present invention as having a first type of pre-packaged new fluid supply container.

FIG. 5 is a fragmentary schematic diagram showing a third embodiment of the servicing machine of the present invention as having a second type of pre-packaged new fluid supply container.

FIGS. 7, 8, and 9 are schematic diagrams showing different types of hydraulic system that are serviceable by a second embodiment of the servicing apparatus of the present invention.

FIG. 10 is a schematic diagram showing a fragmentary portion of the second embodiment of the servicing apparatus of the present invention for use in servicing hydraulic systems of the types shown in FIGS. 7, 8, and 9.

DESCRIPTION OF THE PREFERRED EMBODIMENTS

Figure 1:
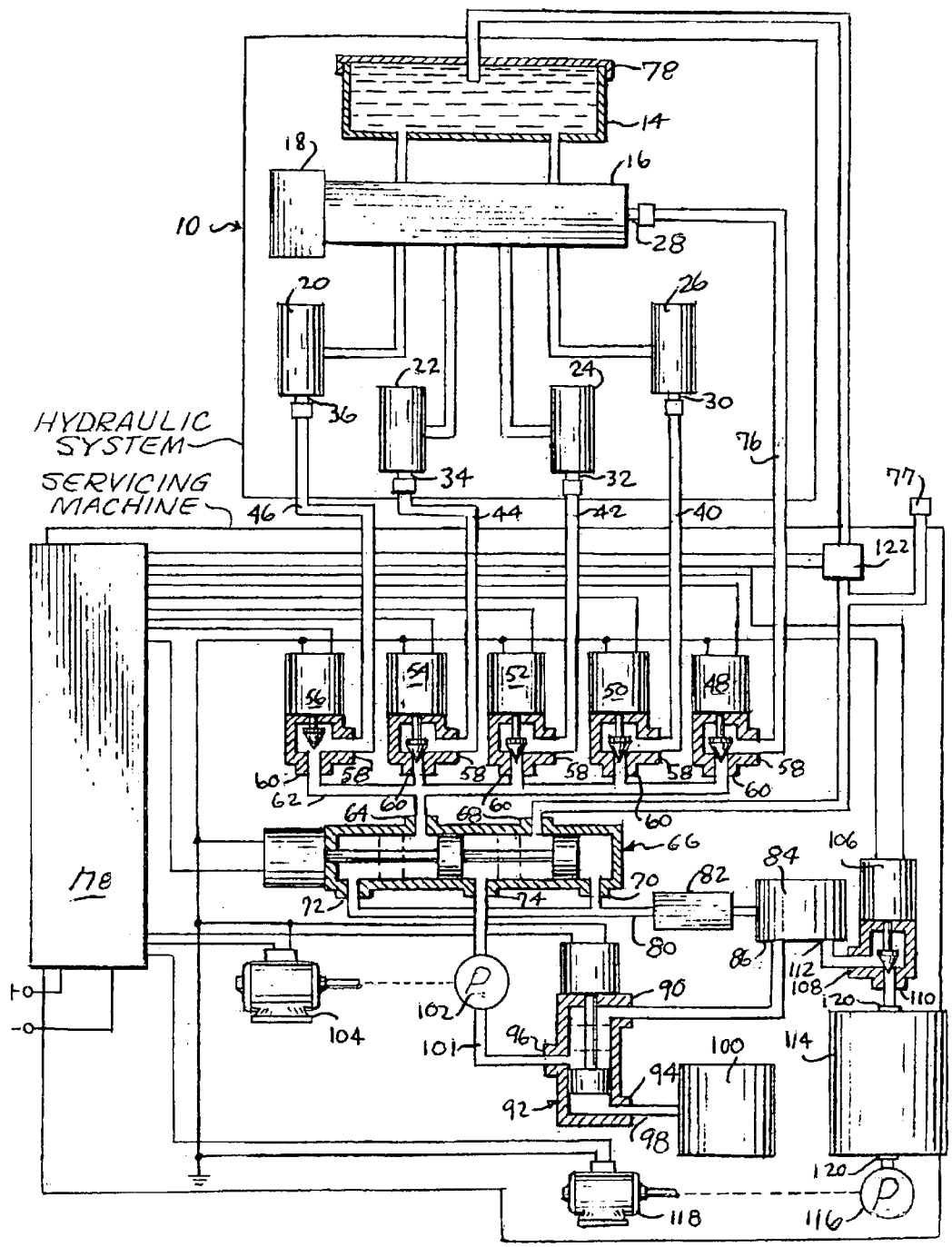
FIG. 1 is a schematic diagram of a first embodiment of the servicing apparatus of the present invention which is shown connected to a typical hydraulic system.

Referring more particularly to the drawings, FIG. 1 shows a hydraulic system which is indicated generally by the reference numeral 10 and the hydraulic servicing apparatus of the present invention which is indicated generally by the reference numeral 12. The hydraulic system 10 is a schematically illustrated typical automotive braking system which includes: a master cylinder 14; an antilock brake system (ABS) modulator 16, an ABS control computer 18, and four slave cylinders 20, 22, 24 and 26. The ABS modulator 16 is provided with a bleeder valve 28 and each of the slave cylinders 20, 22, 24, and 26 has a bleed valve 30, 32, 34 and 36 respectively. It will be understood that not all automotive systems are the same, in some systems the ABS modulator is not used, and a proportioning valve (not shown) is used. In drum brake systems, the slave cylinders are in the form of wheel cylinders and in disc brake systems they are in the form of calipers.

The hydraulic servicing apparatus 12 is provided with five bleeder valve lines 38, 40, 42, 44 and 46 for demountable connection to the bleeder valves 28, 30, 32, 34 and 36 respectively. Five independently operable shutoff valves 48, 50, 52, 54 and 56 are provided with each being mounted in a different one of the bleeder valve lines 38, 40, 42, 44 and 46. The shutoff valves 48, 50, 52, 54 and 56 are preferably in the form of solenoid operated two-way poppet valves each of which has a first port 58 connected to its respective one of the bleeder valve lines 38, 40, 42, 44 and 46 and a second port 60 which is connected to a manifold 62. The manifold 62 connects the second port 60 of each of the shutoff valves 48, 50, 52, 54 and 56 to a first fluid flow port 64 of a flow reversing valve 66.

The flow reversing valve 66 is in the preferred form of a solenoid operated two-position spool valve with its first position being shown in solid lines and its second position being shown in phantom lines. In addition to the first fluid flow port 64, the flow reversing valve 66 has a second fluid flow port 68, a first fluid return port 70, a second fluid return port 72 and a fluid inlet port 74. In the first position of the flow reversing valve 66, the first fluid flow port 64 is in communication with the second return fluid port 72, the second fluid flow port 68 is in communication with the fluid inlet port 74 and the first fluid return port 70 is blocked. In the second position of the flow reversing valve 66, the first fluid flow port 64 is coupled to the fluid inlet port 74, the second fluid flow port 68 is in communication with the first fluid return port 70 and the second fluid return port 72 is blocked. The second fluid flow port 68 of the flow reversing valve 66 is coupled by a master cylinder line 76 to the top of the master cylinder 14, and the master cylinder line may be provided with a pressure take-off port 77 for reasons which will hereinafter be described. The usual top closure (not shown) of the master cylinder 14 is removed while the flushing, fluid replacement and bleeding operations are being preformed and replaced by an adapter 78 that locates the distal end of the master cylinder line 76 in the reservoir of the master cylinder. The first and second fluid return ports 70 and 72 respectively of the flow reversing valve 66 are connected to a fluid return manifold 80 which, in the preferred embodiment, passes returning fluid through a filter 82 to an old fluid holding vessel 84. The filter 82 is for removing particulate contaminants which, if re-circulated through the hydraulic system, as will hereinafter be described in detail, could clog the internal filters (not shown) of the ABS modulator 16.

The old fluid holding vessel 84 is provided with a first outlet port 86 which is coupled by a suitable line 88 to a first inlet port 90 of a fluid selector valve 92. The fluid selector valve 92 has a second inlet port 94 and an outlet port 96, with the second inlet port 94 being coupled by a suitable line 98 to a new fluid supply source which in a first embodiment is in the form of a tank 100. The fluid selector valve 92 is in the preferred form of a solenoid operated spool valve having a first position which is shown in solid lines and a second position which is shown in phantom lines. In the first position of the fluid selector valve 92, the first inlet port 90 is in communication with the outlet port 96 and in the second position, the second inlet port 94 is in communication with the outlet port 96. The outlet port 96 of the fluid selector valve 92 is coupled by a line 101 to the inlet of a pump 102 which is driven by a suitable electric motor 104. When operating, the pump 102 will draw fluid through the fluid selector valve 92 from either the old fluid holding vessel 84 or the new fluid supply vessel 100, depending on the position of the fluid selector valve 92, and the fluid will be supplied under pressure to the fluid inlet port 74 of the flow reversing valve 66. The pump 102 is preferably of the type having a pulsating output, such as a piston pump or a gear-on-gear pump, to produce a surging fluid flow through the hydraulic system 10 to enhance the flushing and bleeding operations of the servicing apparatus 12. The desired pulsating fluid flow can also be accomplished by cyclically interrupting power to the pump 102 or by cycling of the shutoff valves 48, 50, 52, 54, and 56 between their open and closed positions.

Operation

To begin the servicing operation, the bleed valve lines 38, 40, 42, 44, and 46 are connected to the bleeder valves 28, 32, 34, 36 and 38 respectively, and the bleeder valves are all opened. With the flow reversing valve 66 in its first position and the fluid selecting valve 92 in its second position, the pump 102 is operated to supply fluid from the new fluid supply tank 100 to the top of the master cylinder 14. That fluid will flow through the hydraulic system 10 and into the servicing apparatus 12 to fill the apparatus with fluid and when full, the flushing. operation of the hydraulic system 10 can begin.

The flushing operation is started by actuating the fluid selector valve 92 to its first position and starting the pump 102. It does not matter if the flow reversing valve 66 is in the first or second position at the beginning of the flushing operation, however, since it was put into the first position by the operation described above, this description will be started with the flow reversing valve 66 in the first position. The pump 102 will draw fluid from the old fluid holding vessel 84 through the fluid selector valve 92 and supply that fluid under pressure to the inlet port 74 of the flow reversing valve 66. The fluid will move through the flow reversing valve 66 and out through the second fluid flow port 68 thereof into the master cylinder line 76. The fluid supplied to the master cylinder line 76 will be directed into the master cylinder 14 and will move through the hydraulic system 10 in a manner determined by the bleeder line shutoff valves 48, 50, 52, 54 and 56. In FIG. 1 the shutoff valve 56 is shown in the open position and all the others are in their normally closed positions. In this state, the fluid will flow only through the slave cylinder 20 to flush that cylinder and its associated lines. The fluid flowing through the open shutoff valve 56 will flow into the fluid return manifold 80 and from there through the filter 82 into the old fluid holding tank 84. After the fluid is moved through the hydraulic system 10 in this direction for a suitable length of time, the flow reversing valve 66 is switched to its second position which reverses the flow of fluid through the system. More specifically, the reversed fluid flow will move from the first fluid flow port 64 of the flow reversing valve 66, through the open shutoff valve 56, through the slave cylinder 20, through the ABS modulator 16 into the bottom of the master cylinder 14. The fluid entering the bottom of the master cylinder 14 moves out of the master cylinder through the master cylinder line 76 and is returned to the flow reversing valve 66. The fluid will move through the flow reversing valve 66 by entering through the second fluid flow port 68 and exiting through the first fluid return port 70 thereof. The fluid emerging from the first fluid return port 70 enters the fluid return manifold 80 and passes through the filter 82 into the old fluid holding tank 84. By cycling the flow reversing valve 66 back and forth between its first and second positions, fluid flow through the slave cylinder 20 and its associated lines is reversed to agitate the fluid and thus enhance the removal of sludge and corrosion by-products from that branch of the system. Such a flushing operation is repeated for each of the other slave cylinders and their associated lines and for the ABS modulator 16 by sequentially opening the shutoff valves 48, 50, 52, and 54. Opening the other shutoff valves 48, 50, 52, and 54 one at a time with the other shutoff valves in their normally closed positions, the slave cylinders 22, 24 and 26 as well as the ABS modulator 16 and their associated lines can be individually flushed in the manner described above.

When the flushing operation is complete, the old fluid holding tank 84 is emptied by opening a shutoff valve 106 which has an inlet port 108 and an outlet port 110 and is preferably a solenoid operated poppet valve. The inlet port 108 of the shutoff valve 106 is coupled to a second outlet port 112 of the old fluid holding tank 84 and the outlet port 110 of the shutoff valve 106 is coupled to the inlet of a waste fluid disposal tank 114. The outlet of the waste fluid disposal tank 114 is preferably connected to a pump 116 which is operated by an electric motor 118 to empty the fluid from the old fluid holding tank 84. Alternatively, the fluid can be allowed to flow into the waste fluid disposal tank under the influence of gravity. The waste fluid disposal tank 114 is provided with suitable fittings 120 at its inlet and outlet so that it 114 can be removed for fluid disposal purposes.

Replacing the old fluid in the hydraulic system 10 with new fluid is accomplished in a first embodiment by switching the fluid selector valve 92 to its second position to place it in communication with the new fluid supply vessel 100. The pump 102 is operated to draw the fluid out of the new fluid supply vessel 100 and move it through the flow reversing valve 66 into the hydraulic system 10. The fluid can move through the flow reversing valve 66 in either position thereof, however, it is preferred that the flow reversing valve be in the second position. The reason for this is that any air which may be in the hydraulic system 10 will naturally tend to move upwardly and by introducing the fluid into the system at its lowest points, the fluid flow will enhance the upward movement of the air and thereby simultaneously bleed the system.

The servicing apparatus 12 can be configured in various ways for detecting the completion of the fluid replacement and bleeding operation. Detection can be accomplished by placing a fluid condition sensor 122 in the master cylinder line 76 and, in a first embodiment, that sensor is an optical sensor which provides a suitable indication upon detection of clean new fluid in the line 76. The indication provided by the optical sensor can be an audio or visual signal or it can produce an electrical signal which terminates the operation of the apparatus 12. An optical sensor suitable for this purpose is identified as Model No. TSL230, available from Texas Advanced Optoelectronic Solutions, Plano, Tex. This method can be enhanced by injecting an additive such as hydraulic fluid compatible dye into the system in a manner to be hereinafter described. In a second embodiment, the fluid condition sensor 122 is in the form of an ion-selective electrode which provides an indication of the type described above when the metallic ions inherently present in the brake fluid being replaced are no longer detected in the fluid emerging from the hydraulic system 10. An ion-selective electrode suitable for this purpose is Model No. CU3005, available from Weiss Research, Houston, Tex.

Reference is now made to FIG. 3 which shows an additive injection sub-system 124 by which the fluid compatible dye, is introduced into the hydraulic system 10. The injection sub-system 124 includes a solution container 126 having an outlet port 128 which is coupled to a shutoff valve 130 in the preferred form of a normally closed solenoid controlled poppet valve. The shutoff valve 130 has an outlet port 132 that is coupled to the inlet port 134 of a metering valve 136 in the preferred form of an adjustable orifice. The outlet of the metering valve 136 is connected to the line 101 that leads from the fluid selector valve 92 to the pump 102. When the shutoff valve 130 is actuated to its open position, the pump 102 will draw liquid from the solution container 126 and deliver it to the hydraulic system 10 in the manner hereinbefore described. Instead of using the adjustable orifice 136 to control the amount of dye injected into the system, controlling the time that the shutoff valve 130 is open will accomplish the same objective.

In a second embodiment, the old fluid from the hydraulic system 10 is replaced by supplying a known quantity of new fluid to the hydraulic system and when all of the known quantity of new fluid has been introduced, the replacement operation is terminated. The new fluid supply tank 100 of the hereinbefore described embodiment is replaced by either one of two pre-packaged containers which hold an amount of new fluid that is equal to, or slightly larger, than the capacity of the hydraulic system being serviced.

The first of the pre-packaged containers is seen in FIG. 4 to include a collapsible bag 138 having an outlet fitting 140 with the bag being placed in a housing 142. The housing 142 has a removable lid 146 with an inlet port 144 formed therein and a suitable air hose 148 is connected to the inlet port. The housing 142 is provided with an outlet opening 150 through which the outlet fitting 140 of the collapsible bag 138 protrudes. A residual pressure valve 152 is mounted on the distal end of the outlet fitting 140 of the bag 138 to prevent fluid leakage. Flow through the outlet fitting 140 will occur when the differential pressure across the valve 152 exceeds the residual pressure setting thereof. A line 154 connects the discharge end of the residual pressure valve 152 to the second inlet port 94 of the fluid selector valve 92. When the fluid selector valve is in its second position, as shown in solid lines in FIG. 4, and the pump 102 is operated, a negative pressure is applied on the discharge end of the residual pressure valve 152. A positive pressure is applied to the inner end of the residual pressure valve 152 when the collapsible bag 138 is compressed upon the introduction of air under pressure into the housing 142. The combination of the negative and positive pressures on across the residual pressure valve 152 will provide the necessary differential pressure and the fluid within the collapsible bag 138 will be supplied to the hydraulic system 10.

FIG. 5 shows the second type of pre-packaged container as being in the form a cartridge 156 having an outlet fitting 158 which extends through an opening provided in a cartridge retaining housing 160. A residual pressure valve 162 of the type hereinbefore described is mounted on the distal end of the outlet fitting 158 to prevent fluid flow from the cartridge 156 until a predetermined differential pressure is applied across the residual pressure valve 162. A piston 164 is axially movable in the cartridge 156 to push the new fluid out through the outlet fitting 158 and through the fluid selector valve 92 into the hydraulic system 10 as described above. A suitable ram 166, which can be pneumatic, hydraulic or electric, is employed to move the piston 164 axially in the cartridge 156.

The master cylinder line 76 is provided with the pressure take-off port 77 as hereinbefore mentioned and a hand held nozzle 168 is demountably connected to that port. The nozzle is shown in position to accomplish bench bleeding of the master cylinder 14. To accomplish such an operation, all the bleeder line shutoff valves 48, 49, 50, 52 and 54 are de-energized to their normally closed positions to prevent fluid flow through the hydraulic system 10. Then the pump 102 is operated to supply fluid under pressure to the pressure take-off port 77 and to the nozzle 168. The nozzle is positioned to deliver the pressurized fluid to one of the outlet ports of the master cylinder 14 with the other outlet port thereof being closed with a suitable plug 170. Fluid flowing into the master cylinder in this manner will force the air out of the master cylinder to complete the bench bleeding operation. In brake systems that are in need of servicing, the master cylinders contain large amounts of sludge and contamination by-products and for that reason it is a common practice to drain the master cylinder and clean it prior to starting the servicing operation. The hand held nozzle 168 can also be used to clean out the master cylinder by connecting it to the pressure take off port 77 and reversing the rotation of the pump 102 to supply a negative pressure to the nozzle.

Figure 6:
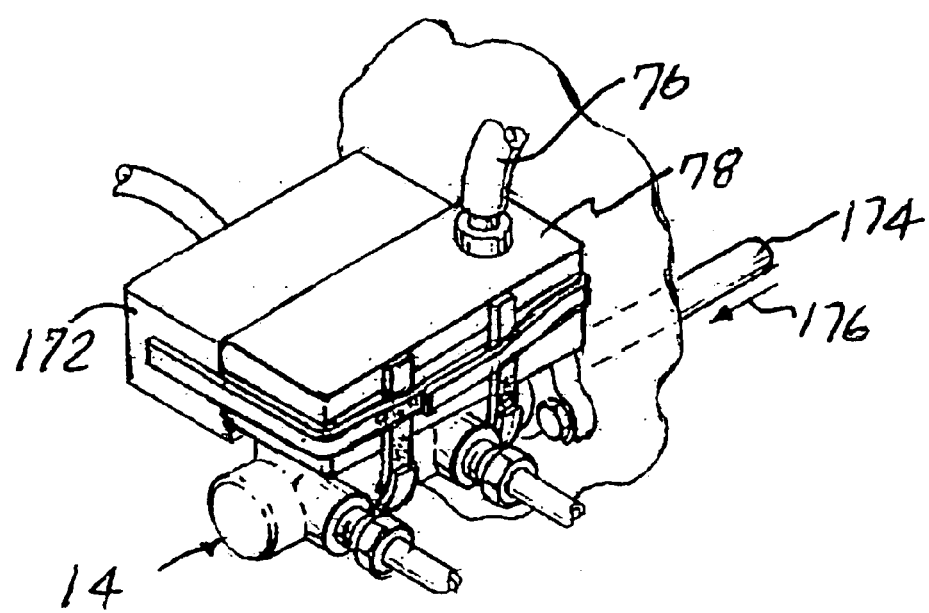
FIG. 6 is a perspective view showing a vibrator demountably attached to a hydraulic system master cylinder.

Referring now to FIG. 6 wherein a suitable vibrator 172 is shown as an electrically operated unit that is demountably attached to the master cylinder 14, and is movable to other system components, to induce vibrations for loosening stubborn contaminants and putting them in suspension for flushing out of the system. A vibrator suitable for this purpose is commercially available from Makita, La Mirada, Calif., Model No. VR251DWDE.

It has been found that a low, or no pressure area exists in the master cylinders of some hydraulic systems and no fluid will flow in that area during flushing operations. When the hydraulic system is put in service after having been serviced as described above, fluid from that low, or no pressure area, will be circulated and contaminate an otherwise clean system. This is overcome by the simple step of pushing the actuator rod 174, as indicated by the arrow 176 in FIG. 6, to move the master cylinder piston (not shown) forward about one inch and holding it there during the flushing operation. This provides a fluid flow path through the otherwise stagnant area of the master cylinder to flush the contaminants therefrom.

The hydraulic servicing apparatus 12 is preferably operated by an electronic control unit 178 which performs the switching operations and controls the timing of the servicing machine 12. Power to the control unit 178 can be obtained from any suitable source such as a self-contained battery (not shown), connecting to the vehicle's power supply or by an external power supply such as a standard a 120 VAC source. The computer is programable so that the switching, timing and other functions of the apparatus can be customized to service various types of hydraulic systems.

The hydraulic brake system 10 shown in FIG. 1 is of the type wherein the slave cylinders 20, 22, 24, and 26 are connected through the ABS modulator 16 to the master cylinder 14 by separate brake lines. This is not always the case and reference is now made to FIGS. 7, 8, and 9 which show different brake systems 10a, 10b, and 10c, respectively, each having a different brake line configuration.

The hydraulic brake system 10a of FIG. 7 shows the larger compartment of a master cylinder 180 as having a single brake line 182 connected to a line 184 which extends between the two front slave cylinders 186 and 188. Similarly, a single line 190 extends from the smaller compartment of the master cylinder 180 and is connected to a cross line 192 which extends between the two rear slave cylinders 194 and 196. Thus, the two front slave cylinders 186 and 188 are in fluid communication with each other and the two rear slave cylinders 194 and 196 are in fluid communication with each other.

The hydraulic brake system 10b of FIG. 8 shows the larger compartment of the master cylinder 180 as having two brake lines 198 and 200 extending therefrom with the line 198 being connected to the front slave cylinder 186 and the line 200 being connecter to the other front slave cylinder 188. As in the brake system 10a of FIG. 6, the system 10b of FIG. 8 has a single line 202 extending from the smaller compartment of the master cylinder 180 and is connected to a cross line 204 which extends between the two rear slave cylinders 194 and 196. In this brake line configuration, the two front slave cylinders 186 and 18B are in fluid communication with each other by virtue of their both being connected to the same compartment of the master cylinder 180, and the rear slave cylinders 194 and 196 are in fluid communication with each other by virtue of the cross brake line 204.

The hydraulic brake system 10c of FIG. 9 shows a first brake line 206 extending from the master cylinder 180 to the front slave cylinder 186 and a diagonal brake line 208 extending from the front slave cylinder 186 to the rear slave cylinder 196. Thus, the front cylinder 186 is in fluid communication with the rear slave cylinder 196. A second brake line 210 extends from the master cylinder 180 to the other front slave cylinder 188 and a diagonal brake line 212 extends from the front slave cylinder 188 to the other rear slave cylinder 194. Therefore, the front and rear slave cylinders 188 and 194, respectively, are in fluid communication with each other.

In hydraulic brake systems of the type wherein pairs of the slave cylinders are in fluid communication with each other, such as the systems 10a, 10b, and 10c, discussed above, a brake flushing technique known as cross-flushing can be advantageously employed. Cross-flushing is accomplished by injecting fluid into one of the two cylinders that are in fluid communication with each other so it flows through both cylinders and the associated brake line to flush that portion of the system. The advantage of cross-flushing is that the fluid flow restrictions inherent in master cylinders and ABS modulators are eliminated resulting in a significant increase in the volume and velocity of the flushing fluid to quickly and effectively purge contaminants from that portion of the hydraulic system. This same technique can be use in bleeding operations for efficiently removing air from the hydraulic system.

Reference is now made to FIG. 10 wherein a fragmentary portion of a second embodiment of the hydraulic servicing apparatus of the present invention is indicated generally by the reference numeral 14a, with this embodiment being configured to accomplish the above describe cross-flushing technique on the hydraulic system 10a. The solenoid operated two-way poppet valves 50, 52, 54 and 56 of the previously describe system 14 have been replaced by solenoid operated three-way poppet valves, three of which are shown and indicated by the reference numerals 214, 216 and 218. It will be understood that each of the three-way poppet valves is connected to a different one of the slave cylinders and the following detailed description of the connection and operation of the poppet valves 214 and 216 also applies to the other poppet valves. The three-way poppet valves 214 and 216 each have a bleeder valve line 220 and 222, respectively, extending from their first ports 224 to the bleeder valves 226 of the slave cylinders 194 and 196 of the hydraulic system 10a. Second ports 228 of the valves 214 and 216 are connected to the manifold 62 which is in fluid communication with the first fluid port 64 of the flow reversing valve 66. The third port 230 of each three-way poppet valve is connected to a collection manifold 232 which is in fluid communication with a first port 234 of a shutoff valve 236, and the second port 238 of the shutoff valve 236 is connected by a fluid return line to the fluid return manifold 80. The shutoff valve 236 is preferably a solenoid operated two-way poppet valve and its function will herein after be described.

A Cross-flushing operation on the two slave cylinders 194, and 196 is accomplished with the flow reversing valve 66 in its second position (shown in solid lines in FIG. 10) so that fluid supplied by the pump 108 is directed through the flow reversing valve 66 and the manifold 62 to the second ports 228 of the three-way poppet valves 214, 216, and 218 and the fourth poppet valve(not shown). The poppet valve 214 is shown in a first position wherein the first and second ports 224 and 228 are in fluid communication with each other and the third port 230 is blocked. The other three way poppet valves 216 and 218 are in the second position wherein the first and third ports 224 and 230 are in fluid communication with each other and the second ports 228 are blocked. Since the second ports 228 of all except the poppet valve 214 are blocked, the fluid supplied through the manifold 62 will flow only into the second port 228 of the valve 214 and out through its first port 224. Fluid emerging from the port 224 of the valve 214 is directed by the bleeder valve line 220 into and through the slave cylinder 194 and through the cross-line 192 into the slave cylinder 196. Since the master cylinder 180 has a relatively high resistance to fluid flow, fluid in the cross-line 192 will take the path of least resistance and will flow and directly and sequentially through the slave cylinders 194 and 196. The fluid will exit the slave cylinder 196 through the bleeder valve line 222 and flow into the first port 224 of the three-way poppet valve 216. With the poppet valve 216 in the second position, fluid will flow out through its third port 230 into the manifold 232 and through the shutoff valve 236 into the fluid return manifold 80 into the holding vessel 84.

The shutoff valve 236 is open position during cross-flushing operations to provide a flow path for fluid returning from the hydraulic system being serviced. When the shutoff valve 236 is actuated to its closed position, the third port 230 of the three-way poppet valves 214, 216, 218 and the fourth valve (not shown), will be blocked and those valves will then function as two way poppet valves. Therefore, when the shutoff valve 236 is closed, the apparatus 14a will function in the manner hereinbefore described with reference to the apparatus 14.

While the principles of the invention have now been made clear in illustrated embodiments, many modifications will be obvious to those skilled in the art which do not depart from those principles. The appended claims are therefore intended to cover such modifications within the limits only of the true spirit and scope of the invention.

What I claim is:

1. An apparatus for flushing contaminants from a hydraulic system which includes a master cylinder and at least one component having a bleeder valve, said apparatus comprising:
   a) a holding vessel for old fluid;
   b) a pump coupled to draw the old fluid from said holding vessel; and
   c) a valve having a master cylinder line and at least one bleed valve line both for connection to the hydraulic system to be serviced, said valve coupled to said pump and to said holding vessel for receiving the old fluid from said pump and directing it through the hydraulic system to be serviced and returning it to said holding vessel.

2. An apparatus as claimed in claim 1 wherein said valve has a first position wherein the fluid from said pump is directed through the hydraulic system to be serviced in a first direction and returned to said holding vessel and a second position wherein the fluid is routed through the hydraulic system in an opposite direction and returned to said holding vessel.

3. An apparatus as claimed in claim 1 wherein the hydraulic systems to be serviced have a plurality of components each of which has a bleeder valve, said apparatus further comprising:
   a) said valve having a plurality of bleeder valve lines each for connection to a different one of the bleeder valves of the components of the hydraulic system to be serviced; and
   b) a plurality of shutoff valves each located in a different one of said plurality of bleeder valve lines, said shutoff valves are individually operable to control the flow of fluid through their respective ones of said bleeder valve lines.

4. An apparatus for flushing, replacing a fluid and bleeding a hydraulic system including a master cylinder and at least one component having a bleeder valve, said apparatus comprising:
   a) a holding vessel for old fluid;
   b) a supply vessel of new fluid;
   c) a fluid selector valve coupled to said holding vessel and to said supply vessel for receiving the old fluid from said holding vessel during system flushing and the new fluid from said supply vessel during system fluid replacement and bleeding;
   d) a pump coupled to move the old fluid from said holding vessel through said flow selector valve during system flushing and to move the new fluid from said supply vessel through said fluid selector valve during fluid replacement and bleeding; and
   e) a flow reversing valve coupled to said pump and to said holding vessel and having a master cylinder line and at least one bleed valve line both for connection to the hydraulic system to be serviced, said flow reversing valve having a first position wherein the fluid from said pump is directed through the system in a first direction and returned to said holding vessel and a second position wherein the fluid is routed through the hydraulic system in an opposite direction and returned to said holding vessel.

5. An apparatus as claimed in claim 4 wherein the hydraulic systems to be serviced have a plurality of components each of which has a bleeder valve, said apparatus further comprising:
   a) said flow reversing valve having a plurality of bleeder valve lines each for connection to a different one of the bleeder valves of the components of the hydraulic systems to be serviced; and
   b) a plurality of shutoff valves each located in a different one of said plurality of bleeder valve lines, said shutoff valves are individually operable to control the flow of fluid through their respective ones of said bleeder valve lines.

6. An apparatus as claimed in claim 4 wherein the hydraulic systems to be serviced have a plurality of components each having a bleeder valve with at least two of the components in fluid communication with each other, said apparatus further comprising:
   a) said flow reversing valve having a plurality of bleeder valve lines each for connection to a different one of the bleeder valves of the components of the hydraulic system to be serviced;
   b) a plurality of three-way valves each located in a different one of the plurality of bleeder valve lines of said flow reversing valve, each of said three-way valves having a first port from which the distal end of the bleed valve line extends, a second port from which the proximal end of the bleeder line extends to said flow reversing valve and a third port;
   c) a fluid collecting manifold coupled to the third port of each of said three-way valves;
   d) a fluid return line connected between said fluid collecting manifold and said fluid return manifold to direct fluid to said holding vessel; and
   e) each of said three-way valves have a first position wherein the first and second ports thereof are in fluid communication with each other and the third port is blocked and a second position wherein the first and third ports are in fluid communication with each other and the second port is blocked.

7. An apparatus as claimed in claim 6 wherein each of said three-way valves are individually operable solenoid valves for sequentially directing fluid through the two components which are in fluid communication with each other and returning that fluid to said holding vessel.

8. An apparatus as claimed in claim 6 and further comprising a shutoff valve in said fluid return line for blocking the flow of fluid to said holding vessel.

9. An apparatus as claimed in claim 4 wherein said fluid selecting valve and said flow reversing valve are solenoid actuated valves.

10. An apparatus as claimed in claim 4 wherein said fluid selecting valve and said flow reversing valve are solenoid actuated valves operated by a programmable electronic control unit which actuates said fluid selecting and flow reversing valves between their first and second positions at predetermined intervals.

11. An apparatus as claimed in claim 4 wherein said flow reversing valve is a solenoid actuated valve which is cycled between its first and second positions for reversing the direction of fluid flow during flushing of the hydraulic system being serviced.

12. An apparatus as claimed in claim 4 wherein said pump produces a pulsating output pressure.

13. An apparatus as claimed in claim 4 and further comprising a filter between said flow reversing valve and said holding vessel for removing contaminants from the fluid being returned to said holding vessel during hydraulic system flushing operations.

14. An apparatus as claimed in claim 4 and further comprising a fluid condition sensor for determining the condition of the fluid being returned to said holding vessel during hydraulic system fluid replacement and bleeding operations and providing an indication upon detecting clean fluid.

15. An apparatus as claimed in claim 4 and further comprising:
   a) an injection sub-system for injecting a fluid compatible dye into the new fluid supplied to the hydraulic system during fluid replacement and bleeding operations; and
   b) an optical sensor for determining the clarity of the fluid being returned to said holding vessel during hydraulic system fluid replacement and bleeding operations and providing an indication of the detection of clear fluid.

16. An apparatus as claimed in claim 4 and further comprising an ion-selective electrode for detecting metallic ions in the fluid being returned to said holding vessel during hydraulic system fluid replacement and bleeding operations and providing an indication upon detecting the absence of the ions in the returning fluid.

17. An apparatus as claimed in claim 4 and further comprising:
   a) a waste fluid vessel having inlet and outlet ports; and
   b) a normally closed shutoff valve connected between said holding vessel and the inlet port of said waste fluid vessel, said shutoff valve being actuated to an open position upon completion of fluid replacement and bleeding operations to direct the fluid from said holding vessel into said waste fluid vessel.

18. An apparatus as claimed in claim 17 and further comprising a pump connected to the outlet port of said waste fluid vessel for pumping the old fluid from said holding vessel into said waste fluid vessel.

19. An apparatus as claimed in claim 4 wherein said supply vessel of new fluid comprises:
   a) a housing having an outlet opening and a removable lid with an air inlet port formed in the lid;
   b) a collapsible bag of new fluid in said housing and having an outlet fitting positioned to extend through the outlet opening of said housing; and
   c) a residual pressure valve on the distal end of the outlet fitting of said collapsible bag and coupled to said fluid selector valve, said residual pressure valve being normally closed and movable to an open position upon the build-up of a differential pressure across said residual pressure valve.

20. An apparatus as claimed in claim 4 wherein said supply vessel of new fluid comprises:
   a) a housing having one end open and an outlet opening in the opposite end;
   b) an elongated cartridge of new fluid positioned in said housing and extending from the open end thereof and having an outlet fitting extending through the outlet opening of said housing, said cartridge having a piston axially movable toward the outlet fitting thereof for moving the new fluid out of said cartridge;
   c) a residual pressure valve on the distal end of the outlet fitting of said cartridge and coupled to said fluid selector valve, said residual pressure valve being normally closed and movable to an open position upon the build-up of a differential pressure across said residual pressure valve; and
   d) a ram operable to move the piston of said cartridge.

21. An apparatus as claimed in claim 4 and further comprising:
   a) a pressure take-off port coupled to the master cylinder line of said flow reversing valve; and
   b) a hand operated nozzle demountably coupled to said pressure take-off port for bench bleeding the master cylinder of the hydraulic system to be serviced when said pump is being rotated in a first direction and said flow reversing valve is in the first position and for cleaning out the master cylinder when said pump is being rotated in a second direction and said flow reversing valve is in the first position.

22. An apparatus as claimed in claim 4 and further comprising a vibrator for demountable attachment to the master cylinder and movable to other components of the hydraulic system to be serviced for loosening sludge and corrosion by-products in the system.

23. A method for flushing, replacing a hydraulic fluid and bleeding a hydraulic system comprising the steps of:
 a) replacing a cap of a master cylinder of the hydraulic system with an adapter having a master cylinder line extending through said adapter into a reservoir of the master cylinder;
 b) attaching a different bleeder valve line to a bleeder valve of each of a plurality of components of the hydraulic system;
 c) opening the bleeder valves;
 d) energizing a pump to draw a fluid from a holding vessel through a fluid selecting valve and through said pump to a flow reversing valve, said flow reversing valve having a first position wherein the fluid from said pump is supplied to said master cylinder line for movement through the hydraulic system in a first direction and returned through said bleeder valves lines and said flow reversing valve to said holding vessel, and having a second position wherein the fluid from said pump is supplied to said bleeder valves for movement through the hydraulic system in an opposite direction;
 e) actuating said flow reversing valve between the first and second positions thereof for flushing contaminants from the hydraulic system; and
 f) actuating said fluid selecting valve to a second position whereby said pump will draw fluid from a supply vessel of new fluid, through said fluid selecting valve, through said pump and through said flow reversing valve into the hydraulic system for replacing the old fluid and bleeding the air out of the hydraulic system.

24. The method of claim 23 comprising the further step of opening a plurality of normally closed shutoff valves one at a time in a predetermined sequence, each of said shutoff valves being located in a different one of said bleeder valve lines.

25. The method of claim 23 comprising the further step of passing the fluid returning to said holding vessel from the hydraulic system through a filter.

26. The method of claim 23 comprising the further step of attaching a vibrator to the master cylinder of the hydraulic system for loosening contaminants in the system.

27. The method of claim 26 comprising the further step of moving the vibrator to other components of the hydraulic system.

28. The method of claim 23 comprising the further steps of:
 a) injecting a fluid compatible dye into the new fluid being supplied to the hydraulic system during fluid replacement and bleeding operations; and
 b) operating an optical sensor for determining the clarity of the fluid being returned to said holding vessel during hydraulic system fluid replacement and bleeding operations and providing an indication upon detecting clear fluid.

29. The method of claim 23 comprising the further step of operating an ion-selective electrode for detecting metallic ions in the fluid being returned to said holding vessel during hydraulic system fluid replacement and bleeding operations and providing an indication upon detecting the absence of the ions in the returning fluid.

30. The method of claim 23 comprising the further step of directing the fluid returned to said holding vessel into a waste fluid vessel after step (f).

31. The method of claim 23 comprising the further step of attaching a hand held nozzle to a pressure takeoff port in the master cylinder line for bench bleeding the master cylinder when the pump is being rotated in a first direction and said flow reversing valve is in the first position and for cleaning out the master cylinder when said pump is being rotated in the opposite direction and said flow reversing valve is in the first position.

32. The method of claim 23 comprising the further step of moving the actuator rod of the master cylinder after step (c) and before step (d) toward the master cylinder approximately an inch to provide a fluid flow path through the master cylinder in an area which would otherwise be stagnant.

33. A method for flushing contaminants from a hydraulic system of a type having a master cylinder and other components, said method comprising the steps of:
 a) connecting a servicing machine to the hydraulic system for moving a flushing fluid through the system; and
 b) attaching a vibrator to the master cylinder to move contaminants in the hydraulic system into suspension within the flushing fluid.

34. The method of claim 33 and comprising the additional step of moving the vibrator to the other components of the hydraulic system after step (b).

35. A method for cross-flushing a pair of hydraulic system components that are interconnected so as to be in fluid communication with each other, the method comprising the steps of:
 a) coupling a first three-way valve to a bleeder valve of the first one of the interconnected system components and a second three-way valve to a bleeder valve of the second one of the interconnected system components;
 b) opening the bleeder valves of the interconnected system components;
 c) energizing a pump to draw fluid from a holding vessel and supply it to the first three-way valve;
 d) actuating the first three-way valve to a position wherein the fluid supplied in step (c) is sequentially directed through the interconnected system components into the second three-way valve; and
 e) actuating the second three-way valve to a position wherein the fluid received from the interconnected system components in step (d) is returned to the holding vessel.

36. The method of claim 35 comprising the further step of passing the fluid returning to said holding vessel from the second three-way valve through a filter.

* * * * *